US008649349B2

(12) United States Patent
Wang

(10) Patent No.: US 8,649,349 B2
(45) Date of Patent: Feb. 11, 2014

(54) METHOD AND SYSTEM FOR REPORTING POWER HEADROOM REPORT (PHR) IN CARRIER AGGREGATION SCENE

(75) Inventor: Jian Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 2 days.

(21) Appl. No.: 13/499,111

(22) PCT Filed: May 24, 2011

(86) PCT No.: PCT/CN2011/074607
§ 371 (c)(1),
(2), (4) Date: Mar. 29, 2012

(87) PCT Pub. No.: WO2012/000355
PCT Pub. Date: Jan. 5, 2012

(65) Prior Publication Data
US 2012/0182960 A1 Jul. 19, 2012

(30) Foreign Application Priority Data

Jun. 29, 2010 (CN) .......................... 2010 1 0214976

(51) Int. Cl.
*H04W 4/00* (2009.01)
*H04W 72/00* (2009.01)
*H04B 7/00* (2006.01)

(52) U.S. Cl.
USPC .......... 370/329; 370/341; 455/450; 455/464; 455/509

(58) Field of Classification Search
None
See application file for complete search history.

(56) References Cited

U.S. PATENT DOCUMENTS

2010/0297993 A1* 11/2010 Heo et al. ...................... 455/423
2013/0153298 A1* 6/2013 Pietraski et al. ................ 175/45

FOREIGN PATENT DOCUMENTS

| CN | 101715207 A | 5/2010 |
|---|---|---|
| CN | 101754393 A | 6/2010 |
| WO | 2010065759 A2 | 6/2010 |

OTHER PUBLICATIONS

International Search Report for PCT/CN2011/074607, English translation attached to original, Both completed by the Chinese Patent Office on Jul. 20, 2011, 6 Pages.
Extended European Search Report for EP 11800100.7, Completed by the European Patent Office on Oct. 1, 2013, 7 Pages.
Nokia Siemens Networks, Nokia Corporation, 3GPP TSG RAN WG1 No. 61 Meeting, May 10-14, 2010, 4 Pages, "Power headrom reporting for uplink carrier aggregation."
MediaTek, 3GPP TSG-RAN WG2 Meeting No. 70bis, Jun. 28-Jul. 2, 2010, 4 Pages, "Per UE PHR for carrier aggregation."

* cited by examiner

*Primary Examiner* — Faruk Hamza
*Assistant Examiner* — Thinh Tran
(74) *Attorney, Agent, or Firm* — Brooks Kushman P.C.

(57) ABSTRACT

A method and system for reporting PHR in carrier aggregation scenarios are disclosed. The method includes: UE encapsulating UE specific PH and/or UL CC specific PH that need to be reported into a same PHR according to a preset order, and meanwhile encapsulating indication information that indicates whether the UE specific PH and each UL CC specific PH are reported or not into the PHR, then sending the PHR to eNB; after receiving the PHR, the eNB analyzing the PHR to obtain the PH and indication information in the PHR, determining the type and quantity of the UE specific PH and/or each UL CC specific PH reported in the PHR according to the indication information and scene configured by eNB for the UE, and then extracting the UE specific PH and/or each UL CC specific PH from the PHR in combination with the preset order.

11 Claims, 5 Drawing Sheets

| | | UE | CC1 | CC2 | CC3 | CC4 | CC5 | |
|---|---|---|---|---|---|---|---|---|
| R | R | 1 | 1 | 0 | 1 | 1 | 1 | Oct 1 |
| R | R | PH | | | | | | Oct 2 |
| R | R | PH | | | | | | Oct 3 |
| R | R | PH | | | | | | Oct 4 |
| ... | | | | | | | | |
| R | R | PH | | | | | | Oct n |

FIG. 2

| | | UE | CC1 | CC2 | CC3 | CC4 | CC5 | |
|---|---|---|---|---|---|---|---|---|
| R | R | 1 | 1 | 0 | 1 | 1 | 1 | Oct 1 |
| R | R | PH | | | | | | Oct 2 |
| T | R | PH | | | | | | Oct 3 |
| T | R | PH | | | | | | Oct 4 |
| ... | | | | | | | | |
| T | R | PH | | | | | | Oct n |

FIG. 3

R/R/E/LCID Subheader

| | | UE | CC1 | CC2 | CC3 | CC4 | CC5 | |
|---|---|---|---|---|---|---|---|---|
| R | R | 1 | 1 | 0 | 1 | 0 | 0 | Oct 1 |
| R | R | \multicolumn{6}{c|}{Index of the UE specific PH} | Oct 2 |
| 1 | R | \multicolumn{6}{c|}{CC1 non-virtual Type1 PH} | Oct 3 |
| 1 | R | \multicolumn{6}{c|}{CC1 non-virtual Type2 PH} | Oct 4 |
| 0 | R | \multicolumn{6}{c|}{CC3 virtual Type1 PH} | Oct 5 |

FIG. 6

METHOD AND SYSTEM FOR REPORTING POWER HEADROOM REPORT (PHR) IN CARRIER AGGREGATION SCENE

CROSS-REFERENCE TO RELATED APPLICATION

This application is the U.S. national phase of PCT Appln. No. PCT/CN2011/074607 filed May 24, 2011 which claims priority to Chinese Application No. 201010214976.0 filed on Jun. 29, 2010, the disclosures of which are incorporated in their entirety by reference herein.

TECHNICAL FIELD

The present invention relates to advanced long term evolution technology in the mobile communication system, and more especially, to a method and system for reporting PHR in carrier aggregation scenarios in the Advanced Long Term Evolution technology.

BACKGROUND OF THE RELATED ART

The LTE (long term evolution) is a new generation mobile communication system brought forward by the 3GPP (the $3^{rd}$ Generation Partnership Project) organization in 2004, and the system uses the OFDM (Orthogonal Frequency Division Multiplex) based wireless access technology to achieve the 100 Mbit/s downlink rate and the 50 Mbit/s uplink rate when the bandwidth is 20M. The LTE-Advance (Advanced Long Term Evolution system) is the latest generation of mobile communication system brought forward by the 3GPP organization in 2008, the system uses the wireless access technology of the carrier aggregation and is able to simultaneously run multiple pairs of uplink and downlink carriers whose maximum bandwidth is 20M, and the downlink rate is up to 1 Gbit/s, and the uplink rate is up to 500 Mbit/s.

To compensate for the pathloss of the wireless channel and reduce the LTE/LTE-A inter-cell interference, both the LTE and the LTE-Advance need to control the power of the physical uplink shared channel. The main process of the LTE uplink power control is as follows: (1) the UE (user equipment) receives a TPC (transmission power control) from the eNB (evolved NodeB); (2) the UE measures the downlink wireless channel RSRP (reference signal reception power) and calculates the Pathloss. The UE takes parameters such as the Pathloss, the uplink shared channel bandwidth, the transport block format and the TPC and so on to calculate the transmission power P; if the user equipment triggers the PHR (power headroom Report) and the transmission conditions are met, the UE also needs to send the PHR in the uplink shared channel, and its $PH=P_{max}-P_{pusch}$. (3) After the eNB receives the PHR from the physical uplink shared channel, it sends the TPC to the UE through the physical downlink control channel (PDCCH) whose format is the DCI Format 0/3/3A. (4) Return to (1), that is, the UE receives the TPC.

In the aforementioned steps (2) and (3), the PHR sent by the UE to the eNB is taken as the resource budget information of the PUSCH (Physical uplink shared channel) to provide the eNB with the basis for the uplink resource allocation. If the PHR reflects that the UE has relatively large power headroom, the eNB is able to allocate relatively large number of wireless resource blocks to the UE; if the PHR reflects that the UE has no or very little power headroom, the eNB is only able to allocate few wireless resource blocks to the UE.

The PHR transmission needs two steps: the first one is triggering, and the second one is reporting. The UE triggers the PHR to report when the related timer expires, the path loss change is relatively large, or the PHR is configured/reconfigured, and after the UE acquires enough PUSCH resources, the UE reports the PHR to the eNB. The PHR is taken as the MAC (Media access control) CE (Control Element) to be multiplexed in the MAC PDU (Protocol Data Unit), and it is sent via the PUSCH.

At present, the PHR MAC CE reported by the R8/R9 UE is 1 byte, and the first two bits are reserved for the system, and the latter 6 bits are the index of the specific value of the power headroom. The MAC subheader corresponding to the PHR MAC CE is one byte, and the MAC subheader uses the logical channel identification (LCID) to determine the PHR MAC CE, the LCID value is uniquely determined in the standard to distinguish from other MAC SDU, other MAC CE or Padding.

In the LTE-Advance, the UE can be configured with up to 5 uplink component carriers. Currently, the 3GPP standard meeting considers that each uplink component carrier configured for the UE should report the PHR so as to help the eNB for uplink resource allocation. The PHR comprises Type1 PHR and Type2 PHR, wherein: the Type1 PHR is the PUSCH PHR which is the same as that in the LTE, and the PHR reflects the PUSCH channel headroom; since both the PUCCH (Physical Uplink Control Channel) and PUSCH can be transmitted simultaneously in the LTE-Advance, the LTE-Advance UE also needs to send the Type2 PHR, namely PUCCH+PUSCH PHR, where $PH=P_{max}-P_{pucch}-P_{pusch}$, and the Type2 PHR reflects the PHR of PUSCH in the case that PUCCH exists. The Type2 PHR is only sent on the UE specific UL PCC (uplink primary component carrier), while the Type1 PHR can be sent on all the UL CCs (including uplink primary component carrier and uplink secondary component carrier) configured by the UE. In addition, in order to meet the UE's overall maximum power requirements, the UE specific PHR also needs to be reported.

Therefore, in the carrier aggregation scenarios, the UE needs to report the PHR in several times, which takes up a lot of resources.

SUMMARY OF THE INVENTION

The purpose of the present invention is to provide a method and system for reporting PHR in carrier aggregation scenarios to make user equipment (UE) report its PH to all the running uplink component carriers in the PHR, thus effectively saving the resources for reporting the PHR.

In order to solve the aforementioned technical problem, the present invention provides a method for reporting power headroom report (PHR) in carrier aggregation scenarios, comprising:

a user equipment (UE) encapsulating UE specific power headroom (PH) and/or uplink component carrier (UL CC) specific PH that need to be reported in a same PHR in accordance with a preset order, and meanwhile encapsulating indication information that indicates whether the UE specific PH as well as each UL CC specific PH configured for the UE are reported or not in the PHR, and then sending the PHR to the eNB; said UL CC comprising an uplink primary component carrier (UL PCC) and an uplink secondary component carrier (UL SCC), and UL PCC specific PH comprising Type1 PH and/or Type2 PH, and UL SCC specific PH comprising the Type1 PH; said preset order comprising: an order between the UE specific PH and each UL CC specific PH configured for the UE, as well as an order between UL PCC specific Type1 PH and Type2 PH; and after the eNB receives the PHR, it analyzing and obtaining the PH and the indication information contained in the PHR, and it determining the type and quantity of the UE specific PH and/or the UL CC specific PH reported in the PHR according to the indication information and scene configured by the eNB for the UE, and then according to the type and quantity of the UE specific PH and/or the UL CC specific PH reported in the PHR, as well as the preset order, it extracting the UE specific PH and/or the UL CC specific PH from the PH contained in the PHR.

The step of encapsulating the indication information that indicates whether the UE specific PH as well as each UL CC specific PH configured for the UE is reported or not in the PHR comprises: the UE respectively indicates whether the UE specific PH is reported or not, whether said each UL CC specific PH configured for the UE is reported or not with a plurality of bits of first byte according to the preset order; the step of UE encapsulating the UE specific PH and/or the UL CC specific PH that need to be reported in the same PHR according to the preset order comprises: said UE respectively carrying the UE specific PH and/or the UL CC specific PH that need to be reported with each of second byte and subsequent bytes in the PHR in accordance with the preset order; the step of the eNB analyzing and obtaining the PH and the indication information contained in the PHR comprises: after the eNB receives the PHR, acquiring whether the UE specific PH is reported or not and whether said each UL CC specific PH configured for the UE is reported or not by analyzing and judging said a plurality of bits of the first byte in the PHR, and acquiring the UE specific PH and/or the UL CC specific PH contained in the PHR by analyzing the second byte and the subsequent bytes in the PHR.

The order between the UE specific PH and said each UL CC specific PH configured for the UE in the preset order is sequentially: the UE specific PH, CC1 specific PH, CC2 specific PH, CC3 specific PH, CC4 specific PH, and CC5 specific PH; in the preset order, the order between the UL PCC specific Type1 PH and Type2 PH is sequentially: Type1 PH, Type2 PH;

the step of respectively indicating whether the UE specific PH is reported or not and whether each UL CC specific PH configured for the UE is reported or not with a plurality of bits of the first byte according to the preset order in the PHR comprises: the UE taking the first and second bits of the first byte as reserved bits in the PHR, taking the $3^{rd}$ bit to indicate whether the UE specific PH is reported or not, respectively taking the $4^{th}$-$8^{th}$ bits to indicate respectively whether specific PHs from CC1 to CC5 are reported or not; the step of respectively carrying the UE specific PH and/or the UL CC specific PH that need to be reported with each of the second byte and the subsequent bytes in said PHR according to the preset order comprises: the UE taking first two bits of each of the second byte and the subsequent bytes as the reserved bits in the PHR in accordance with the preset order, and latter six bits of each of the second byte and the subsequent bytes are used to carry an index of the UE specific PH and/or the UL CC specific PH that need to be reported.

The step of determining the type and quantity of the UE specific PH and/or the UL CC specific PH reported in the PHR comprises:

if the scene configured by the eNB for the UE is judged to be that both the physical uplink control channel (PUCCH) and the physical uplink shared channel (PUSCH) can be transmitted simultaneously, and the UL CC configured for the UE is the UL PCC, the UL PCC is determined to comprise 2 PHs which are respectively Type1 PH and Type2 PH;

if the scene configured by the eNB for the UE is judged to be that both the physical uplink control channel (PUCCH) and the physical uplink shared channel (PUSCH) can be transmitted simultaneously, and the UL CC configured for the UE is the UL SCC, the UL SCC is determined to comprise 1 PH which is the Type1 PH;

if the scene configured by the eNB for the UE is judged to be that the physical uplink control channel (PUCCH) and the physical uplink shared channel (PUSCH) cannot be transmitted simultaneously, and the UL CC configured for the UE is the UL PCC, the UL PCC is determined to comprise 1 PH which is the Type1 PH; and if the scene configured by the eNB for the UE is judged to be that the physical uplink control channel (PUCCH) and the physical uplink shared channel (PUSCH) cannot be transmitted simultaneously, and the UL CC configured for the UE is the UL SCC, the UL SCC is determined to comprise 1 PH which is the Type1 PH;

the Type1 PH comprises virtual Type1 PH and non-virtual Type1 PH; and the Type2 PH comprises virtual Type2 PH and non-virtual Type2 PH;

in the step of determining the type and quantity of the UE specific PH and/or the UL CC specific PH reported in the PHR, if the scene configured by the eNB for the UE is judged to be that both the PUCCH and the PUSCH can be transmitted simultaneously and the UL CC configured for the UE is the UL PCC, whether there are the PUCCH and/or PUSCH transmitted on the UL PCC or not needs to be judged, and if it determines that both PUCCH and PUSCH are transmitted on the UL PCC, the UL PCC is determined to comprise two PHs, which are respectively non-virtual Type1 PH and non-virtual Type2 PH; if it determines that only the PUCCH is transmitted on the UL PCC, the UL PCC is determined to comprise 2 PHs, which are respectively the virtual Type1 PH and non-virtual Type2 PH; if it determines that only the PUSCH is transmitted on the UL PCC, the UL PCC is determined to comprise 2 PHs, which are respectively the non-virtual Type1 PH and the virtual Type2 PH; if it determines that there is neither PUCCH nor PUSCH transmitted on the UL PCC, the UL PCC is determined to comprise two PHs, which are respectively the virtual Type1 PH and the virtual Type2 PH;

if the scene configured by the eNB for the UE is judged to be that both the PUCCH and the PUSCH can be transmitted simultaneously, and the UL CC configured for the UE is the UL SCC, it also needs to judge whether there is the PUSCH transmitted on the UL SCC or not, and if it determines that the PUSCH is transmitted on the UL SCC, the UL SCC is determined to comprise one PH, which is the non-virtual Type1 PH; otherwise, the UL SCC is determined to comprise one PH, which is the virtual Type1 PH;

if the scene configured by the eNB for the UE is judged to be that the PUCCH and the PUSCH cannot be transmitted simultaneously and the UL CC configured for the UE is the UL PCC, it also needs to judge whether there is the PUSCH transmitted on the UL PCC or not, and if it determines that there is the PUSCH transmitted on the UL PCC, the UL PCC is determined to comprise one PH, which is the non-virtual Type1 PH; otherwise, the UL PCC is determined to comprise one PH: the virtual Type1 PH; and if the scene configured by the eNB for the UE is judged to be that the PUCCH and the PUSCH cannot be transmitted simultaneously, and the UL CC configured for the UE is the UL SCC, it also needs to judge whether there is the PUSCH transmitted on the UL SCC or not, and if it determines that the PUSCH is transmitted on the UL SCC, the UL SCC is determined to comprise one PH, which is the non-virtual Type1

PH; otherwise, the UL SCC is determined to comprise 1 PH, which is the virtual Type1 PH.

The method also comprises: the UE taking a bit of each byte used to carry each UL CC specific PH in the PHR to indicate whether the UL CC specific PH carried in the byte is the virtual PH or the non-virtual PH.

In the step of sending the PHR to the eNB, the UE sends the PHR on any UL CC allocated by the eNB to the UE.

In order to solve the aforementioned technical problem, the present invention also provides a system for reporting power headroom report (PHR) in the carrier aggregation scenarios, and the system comprises user equipment (UE) and evolved NodeB (eNB), wherein, the UE is configured to: encapsulate UE specific power headroom (PH) and/or uplink component carrier (UL CC) specific PH that need to be reported in a same PHR in accordance with a preset order, and meanwhile, encapsulate indication information that indicates whether the UE specific PH as well as said each UL CC specific PH configured for the UE are reported or not in the PHR, and then send the PHR to the eNB; wherein, said UL CC comprises an uplink primary component carrier (UL PCC) and an uplink secondary component carrier (UL SCC), and the UL PCC specific PH comprises Type1 PH and/or Type2 PH, and the UL SCC specific PH comprises the Type1 PH; said preset order comprises: an order between the UE specific PH and said each UL CC specific PH configured for the UE, as well as an order between the UL PCC specific Type1 PH and Type2 PH.

the eNB is configured to: after the PHR is received, analyze and obtain the PH and the indication information contained in the PHR, determine the type and quantity of the UE specific PH and/or the UL CC specific PH reported in the PHR according to the indication information and the scene configured by the eNB for the UE, and then according to the type and quantity of the UE specific PH and/or the UL CC specific PH reported in the PHR, as well as the preset order, extract the UE specific PH and/or the UL CC specific PH from the PH contained in the PHR.

The UE is configured to encapsulate the indication information as well as the UE specific PH and/or the UL CC specific PH that need to be reported as follows: respectively indicating whether the UE specific PH is reported or not and whether said each UL CC specific PH configured for the UE is reported or not with a plurality of bits of the first byte in the PHR according to the preset order; and respectively carrying the UE specific PH and/or the UL CC specific PH that need to be reported with each of the second byte and the subsequent bytes in the PHR in accordance with the preset order;

the eNB is configured to acquire the PH and the indication information contained in the PHR through the following method: after receiving the PHR, determining whether the UE specific PH is reported or not and whether said each UL CC specific PH configured for the UE is reported or not by analyzing and judging said a plurality of bits of the first byte in the PHR, and acquiring the UE specific PH and/or the UL CC specific PH contained in the PHR by analyzing the second byte and the subsequent bytes in the PHR.

The order between the UE specific PH and said each UL CC specific PH configured for the UE in the preset order is sequentially: the UE specific PH, the CC1 specific PH, the CC2 specific PH, the CC3 specific PH, the CC4 specific PH, and the CC5 specific PH; in the preset order, the order between the UL PCC specific Type1 pH and Type2 PH is sequentially: Type1 PH, Type2 PH;

the UE is configured to indicate whether the UE specific PH is reported or not as well as whether said each UL CC specific PH configured for the UE is reported or not through the following method: taking the first and second bits of the first byte as reserved bits in the PHR, taking the $3^{rd}$ bit to indicate whether the UE specific PH is reported or not, taking the $4^{th}$-$8^{th}$ bits to indicate respectively whether the specific PHs from CC1 to CC5 are reported or not; and the UE is configured to carry the UE specific PH and/or the UL CC specific PH that need to be reported through the following method: taking the first two bits of each of the second byte and subsequent bytes as the reserved bits in the PHR in accordance with the preset order, and taking the latter six bits to carry an index of the UE specific PH and/or the UL CC specific PH that need to be reported.

The eNB is configured to determine the type and quantity of the UE specific PH and/or the UL CC specific PH that need to be reported in the PHR through the following method:

if the scene configured by the eNB for the UE is judged to be that both the physical uplink control channel (PUCCH) and the physical uplink shared channel (PUSCH) can be transmitted simultaneously and the UL CC configured for the UE is the UL PCC, the UL PCC is determined to comprise 2 PHs which are respectively the Type1 PH and the Type2 PH;

if the scene configured by the eNB for the UE is judged to be that both the physical uplink control channel (PUCCH) and the physical uplink shared channel (PUSCH) can be transmitted simultaneously, and the UL CC configured for the UE is the UL SCC, the UL SCC is determined to comprise 1 PH which is the Type1 PH;

if the scene configured by the eNB for the UE is judged to be that the physical uplink control channel (PUCCH) and the physical uplink shared channel (PUSCH) cannot be transmitted simultaneously and the UL CC configured for the UE is the UL PCC, the UL PCC is determined to comprise one PH which is the Type1 PH; and if the scene configured by the eNB for the UE is judged to be that the physical uplink control channel (PUCCH) and the physical uplink shared channel (PUSCH) cannot be transmitted simultaneously, and the UL CC configured for the UE is the UL SCC, the UL SCC is determined to comprise one PH which is the Type1 PH;

the Type1 PH comprises the virtual Type1 PH and the non-virtual Type1 PH; and the Type2 PH comprises the virtual Type2 PH and the non-virtual Type2 PH;

the eNB is also configured to determine the type and quantity of the UE specific PH and/or the UL CC specific PH reported in the PHR through the following method:

if the scene configured for the UE is judged to be that both the PUCCH and the PUSCH can be transmitted simultaneously and the UL CC configured for the UE is the UL PCC, whether there is the PUCCH and/or PUSCH transmitted on the UL PCC or not needing to be judged, and if it determines that both PUCCH and PUSCH are transmitted on the UL PCC, the UL PCC being determined to comprise two PHs, which are respectively the non-virtual Type1 PH and the non-virtual Type2 PH; if it determines that only the PUCCH is transmitted on the UL PCC, the UL PCC being determined to comprise 2 PHs, which are respectively the virtual Type1 PH and non-virtual Type2 PH; if it determines that only the PUSCH is transmitted on the UL PCC, the UL PCC being determined to comprise 2 PHs, which are respectively the non-virtual Type1 PH and the virtual Type2 PH; if it determines that there is neither PUCCH nor PUSCH transmitted on the UL PCC, the UL PCC being determined to comprise two PHs, which are respectively the virtual Type1 PH and the virtual Type2 PH;

if the scene configured for the UE is judged to be that both the PUCCH and the PUSCH can be transmitted simultaneously and the UL CC configured for the UE is the UL SCC, it also needing to judge whether there is the PUSCH transmitted on the UL SCC or not, and if it determines that the PUSCH is transmitted on the UL SCC, the UL SCC being determined to comprise one PH, which is the non-virtual Type1 PH; otherwise, the UL SCC being determined to comprise one PH, which is the virtual Type1 PH;

if the scene configured for the UE is judged to be that the PUCCH and the PUSCH cannot be transmitted simultaneously and the UL CC configured for the UE is the UL PCC, it also needing to judge whether there is the PUSCH transmitted on the UL PCC or not, and if it determines that the PUSCH is transmitted on the UL PCC, the UL PCC being determined to comprise one PH, which is the non-virtual Type1 PH; otherwise, the UL PCC being determined to comprise one PH, which is the virtual Type1 PH; and if the scene configured for the UE is judged to be that the PUCCH and the PUSCH cannot be transmitted simultaneously and the UL CC configured for the UE is the UL SCC, it also needing to judge whether there is the PUSCH transmitted on the UL SCC or not, and if it determines that the PUSCH is transmitted on the UL SCC, the UL SCC being determined to comprise one PH, which is the non-virtual Type1 PH; otherwise, the UL PCC being determined to comprise one PH, which is the virtual Type1 PH.

The UE is also configured to: take a bit of each byte used to carry each UL CC specific PH in the PHR to indicate whether the UL CC specific PH carried in the byte is the virtual PH or the non-virtual PH.

The UE is configured to send the PHR on any UL CC allocated by the eNB to the UE.

The present invention also provides a UE for reporting power headroom report (PHR) in the carrier aggregation scenarios, and the UE is configured to:

encapsulate UE specific power headroom (PH) and/or uplink component carrier (UL CC) specific PH which need to be reported in a same PHR in accordance with a preset order, and meanwhile, encapsulate indication information that indicates whether the UE specific PH as well as each UL CC specific PH configured for the UE are reported or not in the PHR, and then send the PHR to the eNB; wherein, said UL CC comprises uplink primary component carrier (UL PCC) and uplink secondary component carrier (UL SCC), and the UL PCC specific PH comprises Type1 PH and/or Type2 PH, and the UL SCC specific PH comprises the Type1 PH; said preset order comprises: an order between the UE specific PH and said each UL CC specific PH configured for the UE, as well as an order between the UL PCC specific Type1 pH and the UL PCC specific Type2 PH.

The present invention provides a method and system for reporting PHR in carrier aggregation scenarios, to make the UE can report its pH on all the running uplink component carriers in the PHR, the PHR can be sent on any component carrier newly allocated with uplink resources, thus effectively saving the resources for reporting the PHR.

BRIEF DESCRIPTION OF DRAWINGS

FIG. 2 is a schematic diagram of a PHR encapsulation format in accordance with an embodiment the present invention;

FIG. 3 is a schematic diagram of another PHR encapsulation format in accordance with an embodiment the present invention;

FIG. 6 is a schematic diagram of the PHR format encapsulated in an application example of the present invention.

PREFERRED EMBODIMENTS OF THE PRESENT INVENTION

In a certain subframe, the eNB allocates the uplink resource (UL resource) to the UE for new transmission. When any UL CC acquires new UL resources, the UE attempts to report the PHR to the eNB. Herein, the present invention provides a method and system for reporting the PHR in carrier aggregation scenarios, to effectively save the resource overhead for reporting.

The embodiment of the present invention will be described in detail in combination with the accompanying drawings in the following.

Figure 1:
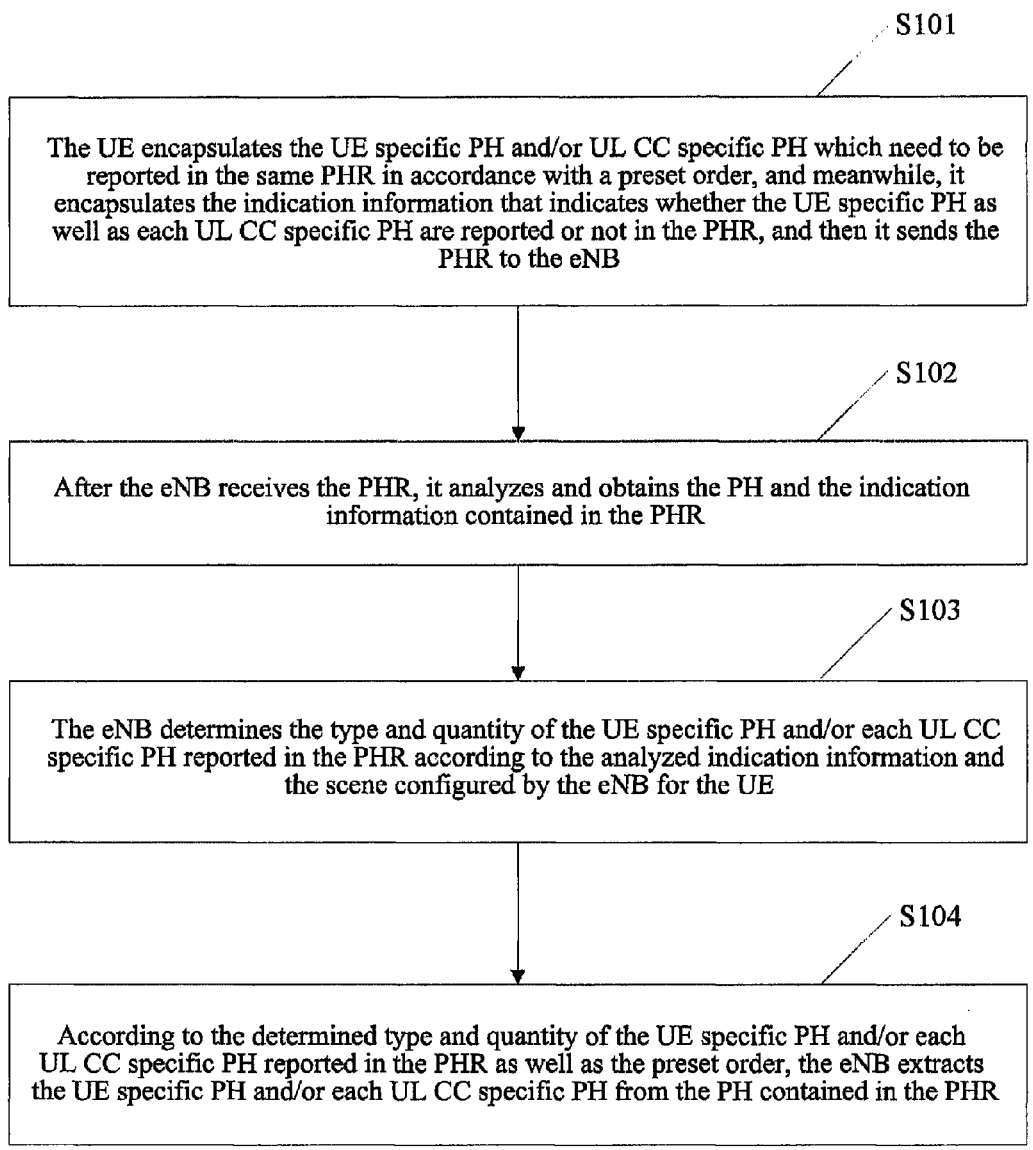
FIG. 1 is a flow chart of a method for reporting PHR in the carrier aggregation scenarios in accordance with an embodiment of the present invention.

Refer to FIG. 1, and FIG. 1 shows a method for reporting the PHR in the carrier aggregation scenarios in accordance with an embodiment of the present invention, and the method comprises the steps:

step S101: the UE encapsulates the UE specific power headroom (PH) and/or uplink component carrier (UL CC) specific PH which need to be reported in the same PHR in accordance with a preset order, and meanwhile, it encapsulates the indication information that indicates whether the UE specific PH as well as each UL CC specific PH are reported or not in the PHR, and then sends the PHR to the eNB;

step S102: after the eNB receives the PHR, it analyzes the PH and the indication information contained in the PHR;

step S103: the eNB determines the type and quantity of the UE specific PH and/or each UL CC specific PH reported in the PHR according to the analyzed indication information and the scene configured by the eNB for the UE;

step S104: according to the determined type and quantity of the UE specific PH and/or each UL CC specific PH reported in the PHR as well as the preset order, the eNB extracts the UE specific PH and/or each UL CC specific PH from the PH contained in the PHR.

Furthermore, in the aforementioned S101:

said UL CC comprises the uplink primary component carrier (UL PCC) and the uplink secondary component carrier (UL SCC), and the UL PCC specific PH comprises the Type1 PH and/or the Type2 PH, and the UL SCC specific PH comprises the Type1 PH; said preset order comprises: an order between the UE specific PH and each UL CC specific PH configured for the UE, as well as an order between the UL PCC specific Type1 PH and the UL PCC specific Type2 PH.

Specifically, said UE reports the PH of UL CC according to the scene allocated to it, comprising:

if the scene configured for the UE is that both the physical uplink control channel (PUCCH) and the physical uplink shared channel (PUSCH) can be transmitted simultaneously and the UL CC configured for the UE is the UL PCC, the UE reports the above two UL PCC PHs, which are respectively the Type1 PH and the Type2 PH;

if the scene configured for the UE is that both the PUCCH and the PUSCH can be transmitted simultaneously and the UL CC configured for the UE is the UL SCC, the UE reports one PH of the UL SCC, which is the Type1 PH;

if the scene configured for the UE is that the PUCCH and the PUSCH cannot be transmitted simultaneously and the UL CC configured for the UE is the UL PCC, the UE reports one PH of the UL PCC, which is the Type1 PH; and if the scene configured for the UE is that the PUCCH and the PUSCH cannot be transmitted simultaneously and the UL CC configured for the UE is the UL SCC, the UE reports one PH of the UL SCC, which is the Type1 PH.

Preferably, the UE respectively indicates whether the UE specific PH is reported or not and whether each UL CC specific PH configured for the UE is reported or not with a plurality of bits of the first byte in the PHR according to the preset order; said UE respectively carries the UE specific PH and/or each UL CC specific PH that need to be reported in each of the second byte and subsequent bytes in accordance with the preset order. Thus, when performing the aforementioned step S102, after the eNB receives the PHR, it acquires whether the UE specific PH is reported or not and whether each UL CC specific PH configured for the UE is reported or not by analyzing and judging said a plurality of bits of the first byte in the PHR, and acquires the UE specific PH and/or each UL CC specific PH contained in the PHR by analyzing the second byte and the subsequent bytes in the PHR.

For example, as shown in FIG. 2, the order between the UE specific PH and said each UL CC specific PH configured for the UE in the preset order is set sequentially: the UE specific PH, the CC1 specific PH, the CC2 specific PH, the CC3 specific PH, the CC4 specific PH and the CC5 specific PH; in the preset order, the order between the two different types of pHs corresponding to the UL PCC is sequentially: the Type1 PH, the Type2 PH. The UE takes the first and second bits of the first byte as the reserved bits in the PHR, takes the $3^{rd}$ bit to indicate whether the UE specific PH is reported or not and takes the $4^{th}$-$8^{th}$ bits to respectively indicate whether specific PHs from the CC1 to the CC5 are reported or not; and the UE takes the first two bits of each of the second byte and the subsequent bytes as the reserved bits, and the latter six bits are used to carry the index of the UE specific PH and/or each UL CC specific PH that need to be reported. Thus, after the eNB receives the PHR, it acquires whether the UE specific PH is reported or not by analyzing and judging the $3^{rd}$ bit of the first byte in the PHR, and acquires whether the specific PHs from the CC1 to the CC5 are reported or not by analyzing and judging the $4^{th}$-$8^{th}$ bits of the first byte in the PHR, and acquires the UE specific PH and/or each UL CC specific PH contained in the PHR by analyzing the second byte and the subsequent bytes in the PHR.

Furthermore, the Type1 PH might also includes virtual Type1 PH and non-virtual Type1 PH; and the Type2 PH might also includes the virtual Type2 PH and the non-virtual Type2 PH. That is, the PHs reported by the UE in the PHR might comprise one or more of the virtual Type1 PH, the non-virtual Type1 PH, the virtual Type2 PH, the non-virtual Type2 PH and the UE specific PH. The virtual PH refers to the PH calculated by using parameters such as the default bandwidth, the default format and so on. The Type1 PH being virtual represents that corresponding PUSCH is not sent; the Type2 PH being virtual represents that the corresponding PUCCH is not sent. Specifically:

if the scene configured for the UE is that both the PUCCH and the PUSCH can be transmitted simultaneously and the UL CC configured for the UE is the UL PCC, and if both PUCCH and PUSCH are transmitted on the UL PCC, 2 PHs of the UL PCC reported by the UE are respectively the non-virtual Type1 PH and the non-virtual Type2 PH; if only the PUCCH is transmitted on the UL PCC, 2 PHs of the UL PCC reported by the UE are respectively the virtual Type1 PH and non-virtual Type2 PH; if only the PUSCH is transmitted on the UL PCC, 2 PHs of the UL PCC reported by the UE are respectively the non-virtual Type1 PH and the virtual Type2 PH; if neither PUCCH nor PUSCH is transmitted on the UL PCC, 2 PHs of the UL PCC reported by the UE are respectively the virtual Type1 PH and the virtual Type2 PH.

If the scene configured for the UE is that both the PUCCH and the PUSCH can be transmitted simultaneously and when the UL CC configured for the UE is the UL SCC, and if there is the PUSCH transmitted on the UL SCC, the UL SCC reported by the UE comprises one PH, which is the non-virtual Type1 PH; if there is no PUSCH transmitted on the UL SCC, the UL SCC reported by the UE comprises one PH, which is the virtual Type1 PH;

if the scene configured for the UE is that the PUCCH and the PUSCH cannot be transmitted simultaneously and the UL CC configured for the UE is the UL PCC, and if there is the PUSCH transmitted on the UL PCC, the UL PCC reported by the UE comprises one PH, which is the non-virtual Type1 PH; if there is no PUSCH transmitted on the UL PCC, the UL PCC reported by the UE comprises one PH, which is the virtual Type1 PH;

if the scene configured for the UE is that the PUCCH and the PUSCH cannot be transmitted simultaneously and the UL CC configured for the UE is the UL SCC, and if there is the PUSCH transmitted on the UL SCC, the UL SCC reported by the UE comprises one PH, which is the non-virtual Type1 PH; if there is no PUSCH transmitted on the UL SCC, the UL SCC reported by the UE comprises one PH, which is the virtual Type1 PH.

To further distinguish the virtual PH and the non-virtual PH, preferably, the UE also takes a bit of each byte that is used to carry each UL CC specific PH in the PHR to indicate whether the PH of UL CC carried in the byte is a virtual PH or a non-virtual PH. For example, as shown in FIG. 3, further improvements are made on the basis of the PHR format shown in FIG. 2: the first bit of the third byte and subsequent bytes is taken as the indication bit to indicate whether it is a virtual PH or not, for example, when the value of the indication bit is 0, it indicates that the PH of UL CC carried in the byte where the indication bit is located is a virtual PH, when the value of the indication bit is 1, it indicates that the PH of UL CC carried in the byte where the indication bit is located is a non-virtual PH.

Furthermore, the UE might send the PHR on any UL CC allocated by the eNB to the UE.

The present invention proposes sending the carrier specific and UE specific PH information on the UL Grant component carrier that is newly allocated, a new PHR format is expanded on the basis of the R8/R9 PHR format, all the PHs that need to be reported are sent to the eNB simultaneously, thereby significantly reducing the resources for reporting.

Figure 4:
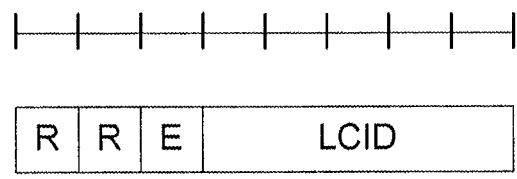
FIG. 4 is a schematic diagram of a MAC subheader encapsulation format in accordance with an embodiment of the present invention.

The MAC subheader corresponding to the PHR MAC CE in an embodiment of the present invention might be compatible with the R8/R9, and specifically, it is shown in FIG. 4.

Furthermore, in the aforementioned step S103:

said eNB determines the type and quantity of the PH of each UL CC configured for the UE according to the scene configured for the UE, comprising:

if the scene configured for the UE is that both the physical uplink control channel (PUCCH) and the physical uplink shared channel (PUSCH) can be transmitted simultaneously and the UL CC configured for the UE is the UL PCC, the UL PCC is determined to comprise 2 PHs which are respectively the Type1 PH and the Type2 PH;

if the scene configured for the UE is that both PUCCH and PUSCH can be transmitted simultaneously and the UL CC configured for the UE is the UL SCC, the UL SCC is determined to comprise 1 PH which is the Type1 PH;

if the scene configured for the UE is that the PUCCH and PUSCH cannot be transmitted simultaneously and the UL CC configured for the UE is the UL PCC, the UL PCC is determined to comprise 1 PH which is the Type1 PH; and if the scene configured for the UE is that the PUCCH and PUSCH cannot be transmitted simultaneously and the UL CC configured for the UE is the UL SCC, the UL SCC is determined to comprise 1 PH which is the Type1 PH.

Furthermore, the Type1 PH comprises the virtual Type1 PH and the non-virtual Type1 PH; and the Type2 PH comprises the virtual Type2 PH and the non-virtual Type2 PH; at this time, the eNB determines the type and quantity of the PH of each UL CC configured by the eNB for the UE according to the scene configured by eNB for the UE, comprising:

if the scene configured for the UE is that both the PUCCH and the PUSCH can be transmitted simultaneously and the UL CC configured for the UE is the UL PCC, whether there is the PUCCH and/or PUSCH transmitted on the UL PCC or not needs to be judged, and if it determines that there are PUCCH and PUSCH transmitted on the UL PCC, the UL PCC is determined to comprise 2 PHs, which are respectively the non-virtual Type1 PH and the non-virtual Type2 PH; if only the PUCCH is transmitted on the UL PCC, the UL PCC is determined to comprise 2 PHs, which are respectively the virtual Type1 PH and the non-virtual Type2 PH; if only the PUSCH is transmitted on the UL PCC, the UL PCC is determined to comprise 2 PHs, which are respectively the non-virtual Type1 PH and the virtual Type2 PH; if neither PUCCH nor PUSCH is transmitted on the UL PCC, the UL PCC is determined to comprise two PHs, which are respectively the virtual Type1 PH and the virtual Type2 PH;

if the scene configured for the UE is that both the PUCCH and the PUSCH can be transmitted simultaneously and the UL CC configured for the UE is the UL SCC, it also needs to judge whether there is the PUSCH transmitted on the UL SCC or not, and if there is the PUSCH transmitted on the UL SCC, the UL SCC is determined to comprise one PH, which is the non-virtual Type1 PH; if there is no PUSCH transmitted on the UL SCC, the UL SCC is determined to comprise one PH, which is the virtual Type1 PH;

if the scene configured for the UE is that the PUCCH and the PUSCH cannot be transmitted simultaneously and the UL CC configured for the UE is the UL PCC, it also needs to judge whether there is the PUSCH transmitted on the UL PCC or not, and if there is the PUSCH transmitted on the UL PCC, the UL PCC is determined to comprise one PH, which is the non-virtual Type1 PH; if there is no PUSCH transmitted on the UL PCC, the UL PCC is determined to comprise one PH, which is the virtual Type1 PH;

if the scene configured for the UE is that the PUCCH and the PUSCH cannot be transmitted simultaneously and the UL CC configured for the UE is the UL SCC, it also needs to judge whether there is the PUSCH transmitted on the UL SCC or not, and if there is the PUSCH transmitted on the UL SCC, the UL SCC is determined to comprise one PH, which is the non-virtual Type1 PH; if there is no PUSCH transmitted on the UL SCC, the UL SCC is determined to comprise one PH, which is the virtual Type1 PH.

Preferably, when the UE respectively carries the UE specific PH and/or each UL CC specific PH that need to be reported with each of the second byte and the subsequent bytes in the PHR, one bit is further used to indicate whether the carried PH is a virtual PH or a non-virtual PH. Thus, when performing the step S103 and analyzing the second byte and the subsequent bytes in the PHR, whether the PH carried in each byte is a virtual PH or a non-virtual PH can be learned by analyzing and judging the bit in each byte, thereby further enriching the instruction content.

In the specific implementation, the UE maintains the periodic PHR timer periodicPHR-Timer and the prohibiting PHR timer prohibitPHR-Timer, and when the periodicPHR-Timer expires, the PHR is triggered, and if the reporting conditions are met, the PHR is reported to the eNB; or, when the prohibitPHR-Timer expires or the prohibitPHR-Timer has expired, but the pathloss change of any CC exceeds the downlink path loss change (d1-PathlossChange), the UE also triggers the PHR, and if the reporting conditions are met, the PHR is reported to the eNB.

Figure 5:
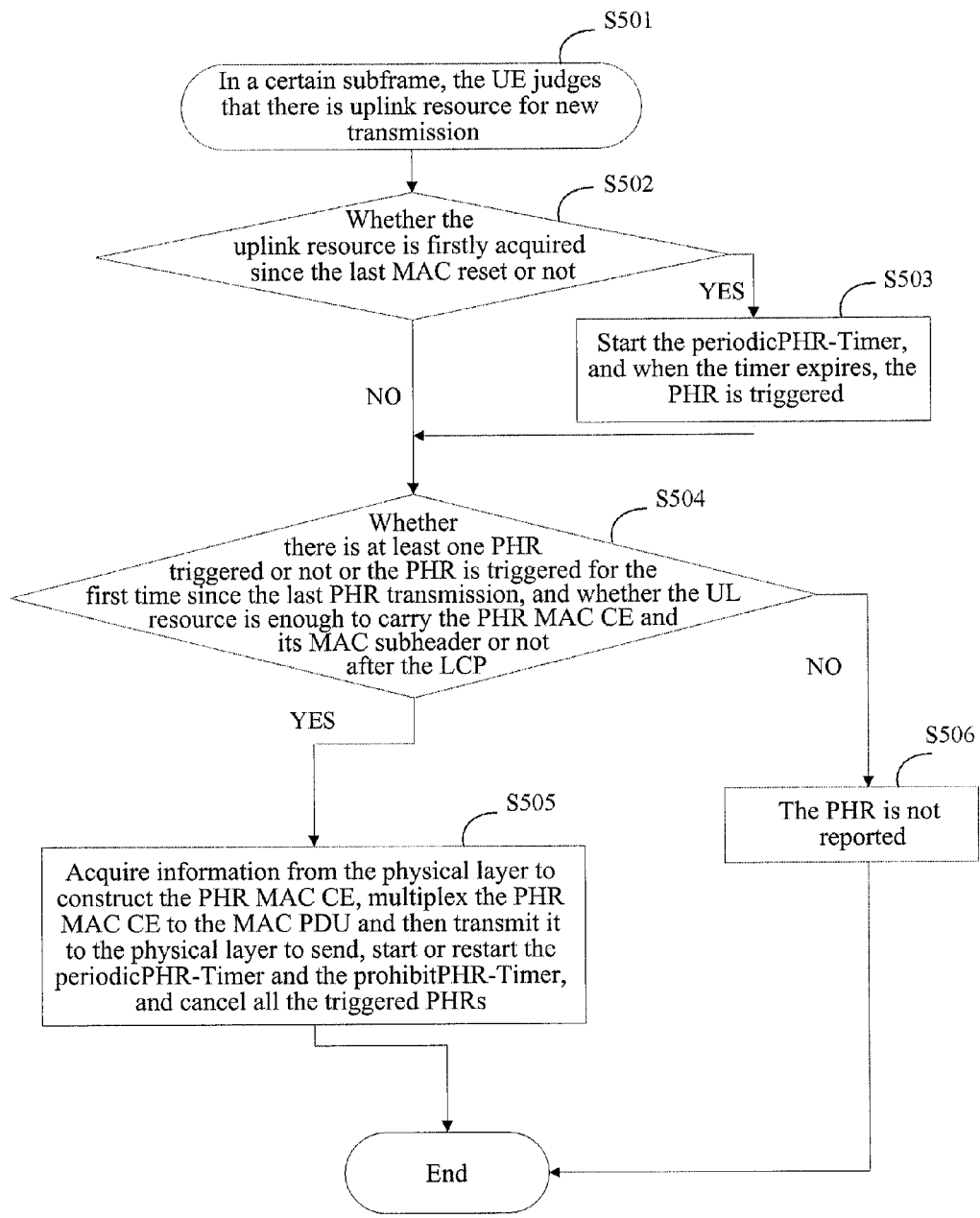
FIG. 5 is an overall flow chart of the UE reporting the PHR in accordance with an embodiment of the present invention.

Refer to FIG. 5, and FIG. 5 illustrates a method for triggering the PHR by the UE maintaining the periodicPHR-Timer:

step S501: in a certain subframe, the UE judges that there is uplink resource for new transmission, proceeding to step S502;

step S502: the UE judges whether the uplink resource is the UL resource acquired firstly since the last MAC reset or not, if yes, proceed to step S503; otherwise, proceed to step S504;

step S503: the periodicPHR-Timer is started, and when the timer expires, the PHR is triggered, proceeding to step S504;

step S504: it is judged whether there is at least one PHR triggered or not or the PHR is triggered for the first time since the last PHR transmission and whether the UL resource is enough to carry the PHR MAC CE and its MAC subheader or not after the LCP (Logical Channel Prioritization), and if yes, proceed to step S505, otherwise, proceed to step S506;

step S505: the PH information is acquired from the physical layer to construct the PHR MAC CE, and the PHR MAC CE is multiplexed to the MAC PDU and then it is transmitted to the physical layer to send, start or restart the periodicPHR-Timer and the prohibitPHR-Timer, and all the triggered PHRs are cancelled and the process ends;

step S506: the PHR is not reported, and the process end.

To implement the method for reporting the PHR in the carrier aggregation scenarios, the present invention also provides a system, and the system comprises the user equipment (UE) and the evolved NodeB (eNB), wherein, the UE is configured to: encapsulate UE specific power headroom (PH) and/or uplink component carrier (UL CC) specific PH that need to be reported in a same PHR in accordance with a preset order, and meanwhile, encapsulate indication information that indicates whether the UE specific PH as well as each UL CC specific PH is reported or not in the PHR, and then send the PHR to the eNB; wherein said UL CC comprises an uplink primary component carrier (UL PCC) and an uplink secondary component carrier (UL SCC), and the UL PCC specific PH comprises Type1 PH and/or Type2 PH, and the UL SCC specific PH comprises the Type1 PH; said preset order comprises: an order between the UE specific PH and each UL CC specific PH configured for the UE, as well as an order between the UL PCC specific Type1 PH and Type2 PH;

the eNB is configured to: after the PHR is received, analyze and obtain the PH and the indication information contained in the PHR, determine the type and quantity of the UE specific PH and/or each UL CC specific PH reported in the PHR according to the indication information and scene configured by the eNB for the UE, and then according to the type and quantity of the UE specific PH and/or each UL CC specific PH reported in the PHR, as well as the preset order, extract the UE specific PH and/or each UL CC specific PH from the PH contained in the PHR.

Furthermore, the UE respectively indicates whether the UE specific PH is reported or not and whether each UL CC specific PH configured for the UE is reported or not with a plurality of bits of first byte according to the preset order; and respectively carries the UE specific PH and/or each UL CC specific PH that need to be reported with each of second byte and subsequent bytes in accordance with the preset order. After the eNB receives the PHR, it acquires whether the UE specific PH is reported or not and whether each UL CC specific PH configured for the UE is reported or not by analyzing and judging said a plurality of bits of the first byte in the PHR, and it acquires the UE specific PH and/or each UL CC specific PH contained in the PHR by analyzing the second byte and the subsequent bytes in the PHR.

Furthermore, the order between the UE specific PH and said each UL CC specific PH configured for the UE in the preset order is sequentially: the UE specific PH, the CC1 specific PH, the CC2 specific PH, the CC3 specific PH, the CC4 specific PH and the CC5 specific PH; the order between 2 different types of PHs corresponding to UL PCC in the preset order is sequentially: Type1 PH, Type2 PH. The UE takes the first and second bits of the first byte as reserved bits in the PHR, takes the $3^{rd}$ bit to indicate whether the UE specific PH is reported or not and takes the $4^{th}$-$8^{th}$ bits to indicate respectively whether the specific PHs from CC1 to CC5 are reported or not; and it takes the first two bits of each of the second byte and subsequent bytes as the reserved bits, and takes the latter six bits to carry an index of the UE specific PH and/or the UL CC specific PH that need to be reported.

Furthermore, the eNB determines the type and quantity of PH of each UL CC configured by eNB for UE according to the scene configured by the eNB for the UE, comprising:

if the scene configured by the eNB for the UE is judged to be that both the physical uplink control channel (PUCCH) and the physical uplink shared channel (PUSCH) can be transmitted simultaneously and the UL CC configured for the UE is the UL PCC, the UL PCC is determined to comprise 2 PHs which are respectively the Type1 PH and the Type2 PH;

if the scene configured by the eNB for the UE is judged to be that both PUCCH and PUSCH can be transmitted simultaneously, and the UL CC configured for the UE is the UL SCC, the UL SCC is determined to comprise 1 PH which is the Type1 PH;

if the scene configured by the eNB for the UE is judged to be that PUCCH and PUSCH cannot be transmitted simultaneously and the UL CC configured for the UE is the UL PCC, the UL PCC is determined to comprise one PH which is the Type1 PH; and if the scene configured by the eNB for the UE is judged to be that PUCCH and PUSCH cannot be transmitted simultaneously and the UL CC configured for the UE is the UL SCC, the UL SCC is determined to comprise one PH which is the Type1 PH.

Furthermore, the Type1 PH comprises the virtual Type1 PH and the non-virtual Type1 PH; the Type2 PH comprises the virtual Type2 PH and the non-virtual Type2 PH.

if the eNB judges that the scene configured by it for the UE is that both the PUCCH and the PUSCH can be transmitted simultaneously and the UL CC configured for the UE is the UL PCC, it also needs to judge whether there is the PUCCH and/or PUSCH transmitted on the UL PCC or not, and if it determines that there are PUCCH and PUSCH transmitted on the UL PCC, the UL PCC is determined to comprise two PHs, which are respectively the non-virtual Type1 PH and the non-virtual Type2 PH; if it determines that only the PUCCH is transmitted on the UL PCC, the UL PCC is determined to comprise 2 PHs, which are respectively the virtual Type1 PH and the non-virtual Type2 PH; if it determines that only the PUSCH is transmitted on the UL PCC, the UL PCC is determined to comprise 2 PHs, which are respectively the non-virtual Type1 PH and the virtual Type2 PH; if it determines that there is neither PUCCH nor PUSCH transmitted on the UL PCC, the UL PCC is determined to comprise two PHs, which are respectively the virtual Type1 PH and the virtual Type2 PH;

if the scene configured for the UE is judged to be that both the PUCCH and the PUSCH can be transmitted simultaneously, and the UL CC configured for the UE is the UL SCC, it also needs to judge whether there is the PUSCH transmitted on the UL SCC or not, and if it determines that the PUSCH is transmitted on the UL SCC, the UL SCC is determined to comprise one PH, which is the non-virtual Type1 PH; otherwise, the UL SCC is determined to comprise one PH, which is the virtual Type1 PH;

if the scene configured for the UE is judged to be that the PUCCH and the PUSCH cannot be transmitted simultaneously and the UL CC configured for the UE is the UL PCC, it also needs to judge whether there is the PUSCH transmitted on the UL PCC or not, and if it determines that there is the PUSCH transmitted on the UL PCC, the UL PCC is determined to comprise one PH, which is the non-virtual Type1 PH; otherwise, the UL PCC is determined to comprise one PH, which is the virtual Type1 PH;

if the scene configured for the UE is judged to be that the PUCCH and the PUSCH cannot be transmitted simultaneously and the UL CC configured for the UE is the UL SCC, it also needs to judge whether there is the PUSCH transmitted on the UL SCC or not, and if it determines that the PUSCH is transmitted on the UL SCC, the UL SCC is determined to comprise one PH, which is the non-virtual Type1 PH; otherwise, the UL SCC is determined to comprise one PH, which is the virtual Type1 PH.

Furthermore, the UE is also configured to: take a bit of each byte used to carry each UL CC specific PH in the PHR to indicate whether the PH of UL CC carried in the byte is the virtual PH or the non-virtual PH.

Furthermore, the UE sends the PHR on any UL CC allocated by the eNB to the UE.

The present invention also provides a UE for reporting power headroom report (PHR) in the carrier aggregation scenarios. Please refer to the above specific description for the function of UE, which is not repeated here.

To further illustrate the implementation of the present invention, a specific application example is used for illustration in the following.

The First Application Example

The eNB configures the UE with the new uplink resources CC1 and CC3: wherein, the CC1 is the PCC, and both the PUSCH and the PUCCH can be transmitted simultaneously and there are PUCCH and PUSCH transmitted on the CC1; the CC3 is the SCC, but there is no PUSCH transmitted on the CC3.

The UE needs to report the UE specific PH, the CC1 PH and the CC3 PH, wherein the CC1 comprises 2 PHs, respectively the Type1 PH and the Type2 PH, and the CC3 comprises one PH, which is the virtual Type1 PH. The format for the UE encapsulating the PHR is shown in FIG. 6, wherein the first two bits of the first byte in the PHR are reserved bits, and the subsequent 6 bits are in turn set as: 1 (indicate to report the UE specific PH), 1 (indicate to report the CC1 specific PH), 0 (indicate not to report the CC2 specific PH), 1 (indicate to report the CC3 specific PH), 0 (indicate not to report the CC4 specific PH), 0 (indicate not to report the CC5 specific PH).

The $3^{rd}$-$8^{th}$ bits of the $2^{nd}$ byte carry the index of the UE specific PH, the $3^{rd}$-$8^{th}$ bits of the $3^{rd}$ byte carry the index of the CC1 Type1 PH, the $3^{rd}$-$8^{th}$ bits of the $4^{th}$ byte carry the index of the CC1 Type2 PH and the $3^{rd}$-$8^{th}$ bits of the fifth byte carry the index of the CC3 virtual Type1 PH, wherein the first bit of the $3^{rd}$ byte is set as 1, the first bit of the $4^{th}$ byte is set as 1, and the first bit of the $5^{th}$ byte is set as 0. Afterwards, the UE sends the encapsulated PHR to the eNB.

After the eNB receives the PHR, the eNB analyzes the PHR and judges the bit used to indicate whether the UE specific PH is reported or not in the first byte in the PHR, and if the value of the bit is 1, it determines that the second byte in the PHR carries the index of the UE specific PH and acquires the index of the UE specific PH; it continues to judge the bit used to indicate whether the CC1 specific PH is reported or not in the first byte in the PHR, and if the value of the bit is 1, the eNB determines that the scene of the uplink CC1 configured by the eNB for the UE is that the CC1 is the PCC and both the PUSCH and the PUCCH can be transmitted simultaneously and both the PUCCH and the PUSCH are transmitted on the CC1, and therefore, the UL CC1 is determined to comprise two PHs, which are respectively the Type1 PH and the Type2 PH, furthermore, the third and fourth bytes in the PHR are determined to respectively carry the CC1 Type1 PH and the CC1 Type2 PH, and 2 PHs of the CC1 are acquired. Similarly, the eNB continues to judge other 4 bits of the first byte in the PH, and performs the same processing to acquire the CC3 PH. By judging whether the first bit of byte carrying each PH is 0 or 1, whether the PH carried in the byte is virtual or non-virtual can be judged, and the eNB is able to acquire more accurate information.

Of course, the present invention might have a variety of other embodiments, and without departing from the spirit and essence of the present invention, those skilled in the field can make different corresponding variations and modifications according to the present invention, and these corresponding variations and modifications should belong to the protection scope of the appended claims in the present invention.

INDUSTRIAL APPLICABILITY

Compared with the existing technology, the present invention makes the UE can report its pH on all the running uplink component carriers in the PHR, the PHR can be sent on any component carrier newly allocated with uplink resources, thus effectively saving the resources for reporting the PHR.

What is claimed is:

1. A method for reporting power headroom report (PHR) in carrier aggregation scenarios, comprising:
a user equipment (UE) encapsulating UE specific power headroom (PH) and/or uplink component carrier (UL CC) specific PH that need to be reported into a same PHR in accordance with a preset order, and meanwhile encapsulating indication information that indicates whether the UE specific PH and each UL CC specific PH configured for the UE are reported or not in the PHR, and then sending the PHR to eNB; said UL CC comprising an uplink primary component carrier (UL PCC) and an uplink secondary component carrier (UL SCC), and UL PCC specific PH comprising Type1 PH and/or Type2 PH, and UL SCC specific PH comprising the Type1 PH; said preset order comprising: an order between the UE specific PH and said each UL CC specific PH configured for the UE, as well as an order between UL PCC specific Type1 PH and UL PCC specific Type2 PH; and
after receiving the PHR, the eNB analyzing and obtaining PH and indication information contained in the PHR, and determining type and quantity of the UE specific PH and/or the UL CC specific PH reported in the PHR according to the indication information and scene configured by the eNB for the UE, and then according to the type and quantity of the UE specific PH and/or the UL CC specific PH reported in the PHR as well as the preset order, extracting the UE specific PH and/or the UL CC specific PH from the PH contained in the PHR;
wherein
The step of encapsulating the indication information that indicates whether the UE specific PH as well as each UL CC specific PH configured for the UE is reported or not in the PHR comprises: the UE respectively indicating whether the UE specific PH is reported or not and whether said each UL CC specific PH configured for the UE is reported or not in the PHR with a plurality of bits of first byte according to the preset order;
the step of UE encapsulating the UE specific PH and/or the UL CC specific PH that need to be reported into the same PHR in accordance with the preset order comprises: said UE respectively carrying the UE specific PH and/or the UL CC specific PH that need to be reported with each of second byte and subsequent bytes in the PHR in accordance with the preset order;
the step of the eNB analyzing and obtaining the PH and the indication information contained in the PHR comprises: after the eNB receives the PHR, acquiring whether the UE specific PH is reported or not and whether said each UL CC specific PH configured for the UE is reported or not by analyzing and judging said a plurality of bits of the first byte in the PHR, and acquiring the UE specific PH and/or the UL CC specific PH contained in the PHR by analyzing the second byte and the subsequent bytes in the PHR; and
wherein,
the order between the UE specific PH and said each UL CC specific PH configured for the UE in the preset order is sequentially: the UE specific PH, CC1 specific PH, CC2 specific PH, CC3 specific PH, CC4 specific PH and CC5 specific PH; in the preset order, the order between the UL PCC specific Type1 PH and Type2 PH is sequentially: Type1 PH, Type2 PH;
the step of respectively indicating whether the UE specific PH is reported or not and whether said each UL CC specific PH configured for the UE is reported or not with a plurality of bits of the first byte according to the preset order in the PHR comprises: the UE taking first and second bits of the first byte as reserved bits in the PHR, taking a $3^{rd}$ bit to indicate whether the UE specific PH is reported or not, respectively taking $4^{th}$-$8^{th}$ bits to indicate respectively whether specific PHs from CC1 to CC5 are reported or not;
the step of respectively carrying the UE specific PH and/or the UL CC specific PH that need to be reported with each of the second byte and the subsequent bytes in said PHR according to the preset order comprises: the UE taking first two bits of each of the second byte and the subsequent bytes as the reserved bits in the PHR in accordance with the preset order, and latter six bits are used to carry an index of the UE specific PH and/or the UL CC specific PH that need to be reported.

2. The method of claim 1, wherein,
the step of determining the type and quantity of the UE specific PH and/or the UL CC specific PH that need to be reported in the PHR comprises:
if the scene configured by the eNB for the UE is judged to be that both physical uplink control channel (PUCCH)

and physical uplink shared channel (PUSCH) can be transmitted simultaneously and UL CC configured for the UE is the UL PCC, the UL PCC being determined to comprise 2 PHs which are respectively Type1 PH and Type2 PH;

if the scene configured by the eNB for the UE is judged to be that the PUCCH and PUSCH can be transmitted simultaneously and the UL CC configured for the UE is the UL SCC, the UL SCC being determined to comprise 1 PH which is the Type1 PH;

if the scene configured by the eNB for the UE is judged to be that the PUCCH and PUSCH cannot be transmitted simultaneously and the UL CC configured for the UE is the UL PCC, the UL PCC being determined to comprise 1 PH which is the Type1 PH; and if the scene configured by the eNB for the UE is judged to be that the PUCCH and PUSCH cannot be transmitted simultaneously and the UL CC configured for the UE is the UL SCC, the UL SCC being determined to comprise 1 PH which is the Type1 PH.

3. The method of claim/, wherein,
the Type1 PH comprises virtual Type1 PH and non-virtual Type1 PH; and the Type2 PH comprises virtual Type2 PH and non-virtual Type2 PH;

in the step of determining the type and quantity of the UE specific PH and/or the UL CC specific PH reported in the PHR, if the scene configured by the eNB for the UE is judged to be that both the PUCCH and the PUSCH can be transmitted simultaneously and the UL CC configured for the UE is the UL PCC, whether there are the PUCCH and/or PUSCH transmitted on the UL PCC or not needs to be judged, and if that there are PUCCH and PUSCH transmitted on the UL PCC is determined, the UL PCC is determined to comprise two PHs which are respectively the non-virtual Type1 PH and non-virtual Type2 PH; if that only the PUCCH is transmitted on the UL PCC is determined, the UL PCC being determined to comprise 2 PHs which are respectively the virtual Type1 PH and non-virtual Type2 PH; if that only the PUSCH is transmitted on the UL PCC is determined, the UL PCC being determined to comprise 2 PHs which are respectively the non-virtual Type1 PH and the virtual Type2 PH; if that there is neither PUCCH nor PUSCH transmitted on the UL PCC is determined, the UL PCC being determined to comprise two PHs which are respectively the virtual Type1 PH and the virtual Type2 PH;

if the scene configured by the eNB for the UE is judged to be that both the PUCCH and the PUSCH can be transmitted simultaneously and the UL CC configured for the UE is the UL SCC, whether there is the PUSCH transmitted on the UL SCC or not also needs to be judged, and if that the PUSCH is transmitted on the UL SCC is determined, the UL SCC being determined to comprise one PH which is the non-virtual Type1 PH; otherwise, the UL SCC being determined to comprise one PH which is the virtual Type1 PH;

if the scene configured by the eNB for the UE is judged to be that the PUCCH and the PUSCH cannot be transmitted simultaneously and the UL CC configured for the UE is the UL PCC, whether there is the PUSCH transmitted on the UL PCC or not also needs to be judged, and if that there is the PUSCH transmitted on the UL PCC is determined, the UL PCC being determined to comprise one PH which is the non-virtual Type1 PH; if that no PUSCH is transmitted on the UL SCC is determined, the UL PCC being determined to comprise one PH which is the virtual Type1 PH; and if the scene configured by the eNB for the UE is judged to be that the PUCCH and the PUSCH cannot be transmitted simultaneously, and the UL CC configured for the UE is the UL SCC, whether there is the PUSCH transmitted on the UL SCC or not also needs to be judged, and if that the PUSCH is transmitted on the UL SCC is determined, the UL SCC being determined to comprise one PH which is the non-virtual Type1 PH; if that no PUSCH is transmitted on the UL SCC is determined, the UL SCC being determined to comprise one PH which is the virtual Type1 PH.

4. The method of claim 3, further comprising:
the UE taking a bit of each byte used to carry said each UL CC specific PH in the PHR to indicate whether the UL CC specific PH carried in the byte is virtual PH or non-virtual PH.

5. The method of claim 1, wherein,
in the step of sending the PHR to the eNB, the UE sends the PHR on any UL CC allocated by the eNB to the UE.

6. A system for reporting power headroom report (PHR) in carrier aggregation scenarios, comprising user equipment (UE) and evolved NodeB (eNB), wherein,
the UE is configured to: encapsulate UE specific power headroom (PH) and/or uplink component carrier (UL CC) specific PH that need to be reported into a same PHR in accordance with a preset order, and meanwhile, encapsulate indication information that indicates whether the UE specific PH as well as each UL CC specific PH configured for the UE are reported or not in the PHR, and then send the PHR to the eNB; wherein, said UL CC comprises an uplink primary component carrier (UL PCC) and an uplink secondary component carrier (UL SCC), and UL PCC specific PH comprises Type1 PH and/or Type2 PH, and UL SCC specific PH comprises the Type1 PH; said preset order comprises: an order between the UE specific PH and said each UL CC specific PH configured for the UE, as well as an order between UL PCC specific Type1 PH and UL PCC specific Type2 PH;

the eNB is configured to: after the PHR is received, analyze and obtain PH and indication information contained in the PHR, determine type and quantity of the UE specific PH and/or the UL CC specific PH reported in the PHR according to the indication information and scene configured by the eNB for the UE, and then according to the type and quantity of the UE specific PH and/or the UL CC specific PH reported in the PHR as well as the preset order, extract the UE specific PH and/or the UL CC specific PH from the PH contained in the PHR;

wherein,
the UE is configured to encapsulate the indication information as well as the UE specific PH and/or the UL CC specific PH that need to be reported through following method: respectively indicating whether the UE specific PH is reported or not and whether said each UL CC specific PH configured for the UE is reported or not with a plurality of bits of first byte in the PHR according to the preset order; and respectively carrying the UE specific PH and/or the UL CC specific PH that need to be reported with each of second byte and subsequent bytes in the PHR in accordance with the preset order;

the eNB is configured to acquire PH and indication information contained in the PHR through following method: after receiving the PHR, acquiring whether the UE specific PH is reported or not and whether said each UL CC specific PH configured for the UE is reported or not by analyzing and judging said a plurality of bits of the first byte in the PHR, and acquiring the UE specific PH and/or the UL CC specific PH contained in the PHR by analyzing the second byte and the subsequent bytes in the PHR; and wherein, the order between the UE specific PH and said each UL CC specific PH configured for the UE in the preset order is sequentially: the UE specific PH, CC1 specific PH, CC2 specific PH, CC3 specific PH, CC4 specific PH and CC5 specific PH; in the preset order, the order between the UL PCC specific Type1 pH and Type2 PH is sequentially; Type1 PH, Type2 PH;

the UE is configured to indicate whether the UE specific PH is reported or not as well as whether said each UL CC specific PH configured for the UE is reported or not through following method: taking first and second bits of the first byte as reserved bits in the PHR, taking a 3rd bit to indicate whether the UE specific PH is reported or not, taking 4th-8th bits to indicate respectively whether specific PHs from CC1 to CC5 are reported or not;

the UE is configured to carry the UE specific PH and/or the UL CC specific PH that need to be reported through following method: taking first two bits of each of the second byte and subsequent bytes as the reserved bits in the PHR in accordance with the preset order, and taking latter six bits to carry an index of the UE specific PH and/or the UL CC specific PH that need to be reported.

7. The system of claim 6, wherein, the eNB is configured to determine the type and quantity of the UE specific PH and/or the UL CC specific PH that need to be reported in the PHR through following method:

if the scene configured by the eNB for the UE is judged to be that both physical uplink control channel (PUCCH) and physical uplink shared channel (PUSCH) can be transmitted simultaneously and UL CC configured for the UE is the UL PCC, the UL PCC being determined to comprise 2 PHs which are respectively Type1 PH and the Type2 PH;

if the scene configured by the eNB for the UE is judged to be that the PUCCH and PUSCH can be transmitted simultaneously and the UL CC configured for the UE is the UL SCC, the UL SCC being determined to comprise 1 PH which is the Type1 PH;

if the scene configured by the eNB for the UE is judged to be that the PUCCH and PUSCH cannot be transmitted simultaneously and the UL CC configured for the UE is the UL PCC, the UL PCC being determined to comprise one PH which is the Type1 PH; and if the scene configured by the eNB for the UE is judged to be that the PUCCH and PUSCH cannot be transmitted simultaneously and the UL CC configured for the UE is the UL SCC, the UL SCC being determined to comprise one PH which is the Type1 PH.

8. The system of claim 7, wherein, the Type1 PH comprises virtual Type1 PH and non-virtual Type1 PH; and the Type2 PH comprises virtual Type2 PH and non-virtual Type2 PH;

the eNB is also configured to determine the type and quantity of the UE specific PH and/or the UL CC specific PH reported in the PHR through following method:

if the scene configured for the UE is judged to be that both the PUCCH and the PUSCH can be transmitted simultaneously and the UL CC configured for the UE is the UL PCC, whether there is the PUCCH and/or PUSCH transmitted on the UL PCC or not needing to be judged, and if that there are PUCCH and PUSCH transmitted on the UL PCC is determined, the UL PCC being determined to comprise two PHs, which are respectively the non-virtual Type1 PH and the non-virtual Type2 PH; if that only the PUCCH is transmitted on the UL PCC is determined, the UL PCC being determined to comprise 2 PHs, which are respectively the virtual Type1 PH and non-virtual Type2 PH; if that only the PUSCH is transmitted on the UL PCC is determined, the UL PCC being determined to comprise 2 PHs, which are respectively the non-virtual Type1 PH and the virtual Type2 PH; if that there is neither PUCCH nor PUSCH transmitted on the UL PCC is determined, the UL PCC being determined to comprise two PHs, which are respectively the virtual Type1 PH and the virtual Type2 PH;

if the scene configured for the UE is judged to be that both the PUCCH and the PUSCH can be transmitted simultaneously and the UL CC configured for the UE is the UL SCC, whether there is the PUSCH transmitted on the UL SCC or not also needing to be judged, and if that the PUSCH is transmitted on the UL SCC is determined, the UL SCC being determined to comprise one PH, which is the non-virtual Type1 PH; if that no PUSCH is transmitted on the UL SCC is determined, the UL SCC being determined to comprise one PH, which is the virtual Type1 PH;

if the scene configured for the UE is judged to be that the PUCCH and the PUSCH cannot be transmitted simultaneously and the UL CC configured for the UE is the UL PCC, whether there is the PUSCH transmitted on the UL PCC or not also needing to be judged, and if that the PUSCH is transmitted on the UL PCC is determined, the UL PCC being determined to comprise one PH, which is the non-virtual Type1 PH; if that no PUSCH is transmitted on the UL PCC is determined, the UL PCC being determined to comprise one PH, which is the virtual Type1 PH; and if the scene configured for the UE is judged to be that the PUCCH and the PUSCH cannot be transmitted simultaneously and the UL CC configured for the UE is the UL SCC, whether there is the PUSCH transmitted on the UL SCC or not also needing to be judged, and if that the PUSCH is transmitted on the UL SCC is determined, the UL SCC being determined to comprise one PH, which is the non-virtual Type1 PH; if that no PUSCH is transmitted on the UL SCC is determined, the UL PCC being determined to comprise one PH, which is the virtual Type1 PH.

9. The system of claim 8, wherein, the UE is also configured to: take a bit of each byte used to carry each UL CC specific PH in the PHR to indicate whether the UL CC specific PH carried in the byte is virtual PH or non-virtual PH.

10. The system of claim 6, wherein, the UE is configured to send the PHR on any UL CC allocated by the eNB to the UE.

11. A UE for reporting power headroom report (PHR) in carrier aggregation scenarios, the UE comprising a processor, wherein the processer is configured to:

encapsulate UE specific power headroom (PH) and/or uplink component carrier (UL CC) specific PH which need to be reported into a same PHR in accordance with a preset order, and meanwhile, encapsulate indication information that indicates whether the UE specific PH as well as each UL CC specific PH configured for the UE are reported or not in the PHR, and then send the PHR to eNB; wherein, said UL CC comprises an uplink primary component carrier (UL PCC) and an uplink secondary component carrier (UL SCC), and the UL PCC specific PH comprises Type1 PH and/or Type2 PH, and the UL SCC specific PH comprises the Type1 PH; said preset order comprises: an order between the UE specific PH and said each UL CC specific PH configured for the UE, as well as an order between UL PCC specific Type1 pH and UL PCC specific Type2 PH;

encapsulate the indication information as well as the UE specific PH and/or the UL CC specific PH that need to be reported through following method: respectively indicating whether the UE specific PH is reported or not and whether said each UL CC specific PH configured for the UE is reported or not with a plurality of bits of first byte in the PHR according to the preset order; and respectively carrying the UE specific PH and/or the UL CC specific PH that need to be reported with each of second byte and subsequent bytes in the PHR in accordance with the preset order; and wherein, the order between the UE specific PH and said each UL CC specific PH configured for the UE in the preset order is sequentially: the UE specific PH, CC1 specific PH, CC2 specific PH, CC3 specific PH, CC4 specific PH and CC5 specific PH; in the preset order, the order between the UL PCC specific Type1 pH and Type2 PH is sequentially; Type1 PH, Type2 PH;

the processor is further configured to indicate whether the UE specific PH is reported or not as well as whether said each UL CC specific PH configured for the UE is reported or not through following method: taking first and second bits of the first byte as reserved bits in the PHR, taking a 3rd bit to indicate whether the UE specific PH is reported or not, taking 4th-8th bits to indicate respectively whether specific PHs from CC1 to CC5 are reported or not; and the processor is further configured to carry the UE specific PH and/or the UL CC specific PH that need to be reported through following method: taking first two bits of each of the second byte and subsequent bytes as the reserved bits in the PHR in accordance with the preset order, and taking latter six bits to carry an index of the UE specific PH and/or the UL CC specific PH that need to be reported.

* * * * *

UNITED STATES PATENT AND TRADEMARK OFFICE
CERTIFICATE OF CORRECTION

| | | |
|---|---|---|
| PATENT NO. | : 8,649,349 B2 | Page 1 of 1 |
| APPLICATION NO. | : 13/499111 | |
| DATED | : February 11, 2014 | |
| INVENTOR(S) | : Jian Wang et al. | |

It is certified that error appears in the above-identified patent and that said Letters Patent is hereby corrected as shown below:

In the Claims

Column 17, Line 22, Claim 3:

After "The method of" delete "claim/" and
Insert -- claim 2 --.

Signed and Sealed this
Twenty-ninth Day of April, 2014

Michelle K. Lee
*Deputy Director of the United States Patent and Trademark Office*